United States Patent
Eelman

(10) Patent No.: US 8,915,705 B2
(45) Date of Patent: Dec. 23, 2014

(54) SEAL ASSEMBLY

(75) Inventor: Rob Eelman, Heino (NL)

(73) Assignee: Siemens Aktiengesellschaft, Munich (DE)

( * ) Notice: Subject to any disclaimer, the term of this patent is extended or adjusted under 35 U.S.C. 154(b) by 1185 days.

(21) Appl. No.: 12/863,838

(22) PCT Filed: Jan. 23, 2009

(86) PCT No.: PCT/EP2009/050783
§ 371 (c)(1),
(2), (4) Date: Oct. 11, 2010

(87) PCT Pub. No.: WO2009/092797
PCT Pub. Date: Jul. 30, 2009

(65) Prior Publication Data
US 2011/0020114 A1 Jan. 27, 2011

(30) Foreign Application Priority Data
Jan. 24, 2008 (EP) .................... 08001351

(51) Int. Cl.
F04D 29/08 (2006.01)
F04D 29/10 (2006.01)
F01D 11/02 (2006.01)
F16J 15/44 (2006.01)
F01D 11/04 (2006.01)

(52) U.S. Cl.
CPC ............ F16J 15/44 (2013.01); F01D 11/025 (2013.01); F16J 15/442 (2013.01); F01D 11/04 (2013.01)
USPC ...................... 415/171.1; 415/230

(58) Field of Classification Search
USPC .......... 415/170.1, 171.1, 173.1, 173.2, 173.4, 415/173.5, 174.4, 174.5, 175–178, 230, 415/231; 277/413, 414, 415
See application file for complete search history.

(56) References Cited

U.S. PATENT DOCUMENTS

| 2,908,515 | A | * | 10/1959 | Copp | 277/513 |
| 3,594,010 | A | * | 7/1971 | Warth | 277/413 |
| 3,614,112 | A |   | 10/1971 | Herzog | |
| 4,350,345 | A |   | 9/1982 | Kalan et al. | |
| 5,161,943 | A | * | 11/1992 | Maier et al. | 415/170.1 |
| 5,190,440 | A | * | 3/1993 | Maier et al. | 415/174.5 |

FOREIGN PATENT DOCUMENTS

| CH | 407168 A | 2/1966 |
| DE | 211478 C | 3/1973 |
| DE | 2143736 A1 | 3/1973 |

* cited by examiner

*Primary Examiner* — Edward Look
*Assistant Examiner* — Jason Davis

(57) ABSTRACT

A seal assembly disposed between a rotor and a stator especially of a turbo-machinery is provided with a close clearance gap there between. The clearance gap is bordered by a rotor surface at the side of the rotor and by a stator surface at the side of the stator. The rotor surface or the stator surface or both are provided with openings which open into at least one chamber arranged at the side of the openings turned away from the clearance gap.

10 Claims, 3 Drawing Sheets

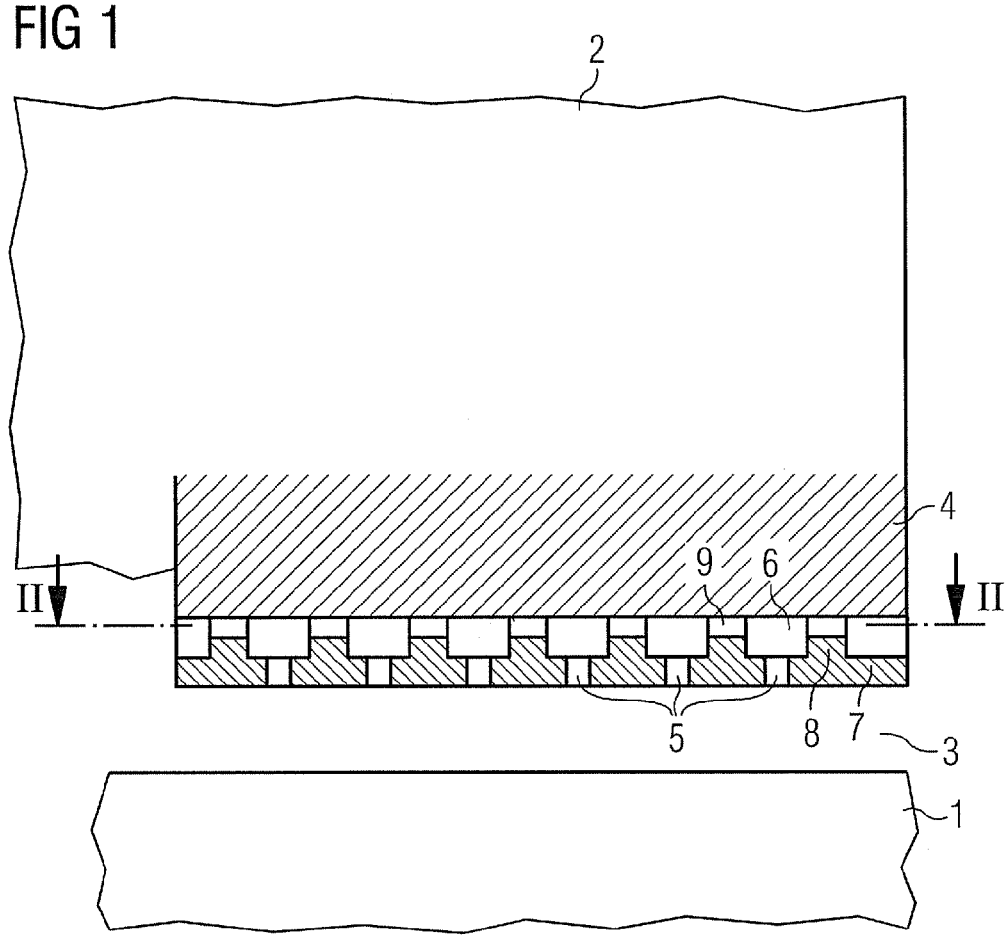
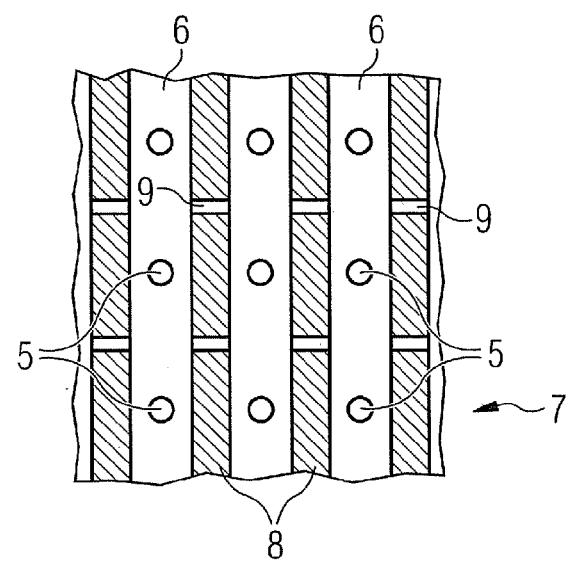

SEAL ASSEMBLY

CROSS REFERENCE TO RELATED APPLICATIONS

This application is the US National Stage of International Application No. PCT/EP2008/050783, filed Jan. 23, 2009 and claims the benefit thereof. The International Application claims the benefits of European Patent Office application No. 08001351.9 EP filed Jan. 24, 2008. All of the applications are incorporated by reference herein in their entirety.

FIELD OF INVENTION

This invention relates to a seal assembly between a rotor and a stator especially of a turbo-machinery with a close clearance gap there between according to the introductory part of the claims.

BACKGROUND OF INVENTION

A type of close clearance gap that is often applied in turbo-machinery is the labyrinth seal. Labyrinth seals generate large magnitude, destabilizing forces on turbo-machinery rotors especially when operating in high density fluids. Over the years several alternative labyrinth configurations have been developed in an attempt to reduce the destabilizing forcing function and at the same time increase the damping properties. Honeycomb style seals are an example in this context. These have been quite successfully applied in high pressure, centrifugal compressors especially in gas reinjection applications. Honeycomb style labyrinths have however a very high direct stiffness and are sensitive to actual rotor position and running gap geometry. This has led to several incidents in the industry where corrective actions were required to bring units within specifications.

U.S. Pat. No. 4,350,345 A, U.S. Pat. No. 3,614,112 A, DE 211 478 C and CH 407 168 A respectively disclose labyrinth seals according to the preamble of the independent claim. Any improvement of stability is not described. Document DE 21 43 736 describes a stuffing-box seal having axial interconnections between chambers connected by openings with a space between two seal elements.

Rotation of the high density gas inside the labyrinth is a root cause for the large magnitude, destabilizing forces inside labyrinth seals. These forces have a pronounced effect on the design of high density turbo-machinery: they limit the maximum possible running speed, the maximum number of impellers at the rotor, the maximum process pressure, the minimum diameter of the rotor shaft, and the efficiency or a combination of these.

Besides labyrinth seals the destabilizing forces can occur in any close clearance gap where a fluid fills the gap between stator part and rotor part.

SUMMARY OF INVENTION

The object of the present invention is to reduce the destabilizing forces acting on the rotor of rotating turbo-machinery.

Starting from a seal assembly according to the introductory part of the independent claim the object is achieved by the features of the characterizing part of the independent claim. Advantageous embodiments of the invention are described in the subclaims.

Through the invention one or more annular chamber(s) between the stator and rotor are created that have multiple openings towards the fluid side. Through the openings the chamber is in contact with the close clearance gap, i.e. the fluid side.

The chambers with these openings have the following characteristics: they minimise circumferential swirling of the fluid thereby minimizing the destabilizing forces. This is accomplished through pressure equalisation in angular direction inside the chamber(s). Through the openings the pressure inside the fluid gap will also be equalized by flow leakage through the openings.

They act as a dynamic damper of dynamics pressure fluctuations through the special combination of the openings and the pressure equalizing chambers. This damping effect can be further enhanced by installation of special damping material in the pressure equalizing chamber.

Basic physics behind the invention are further: —
at low vibration frequencies: radial pressure equalizing effect in the circumferential direction by secondary flow through the annual chambers.
at high vibration frequencies: The combination of chamber (spring) and holes (mass, damper) act as a stabilizing device. (Damper seal function). For this purpose the size of the chamber(s) could be varied by interconnecting them.

The inventive seal assembly is therefore capable to reduce the flow induced excitation forces inside the close clearance gap.

BRIEF DESCRIPTION OF THE DRAWINGS

The invention will be described by way of example with reference to the accompanying drawing in which:

FIG. 1 is a longitudinal section of a seal assembly with a close clearance gap;

FIG. 2 is a partial sectional view along line II-II of FIG. 1;

DETAILED DESCRIPTION OF INVENTION

Figure 3:
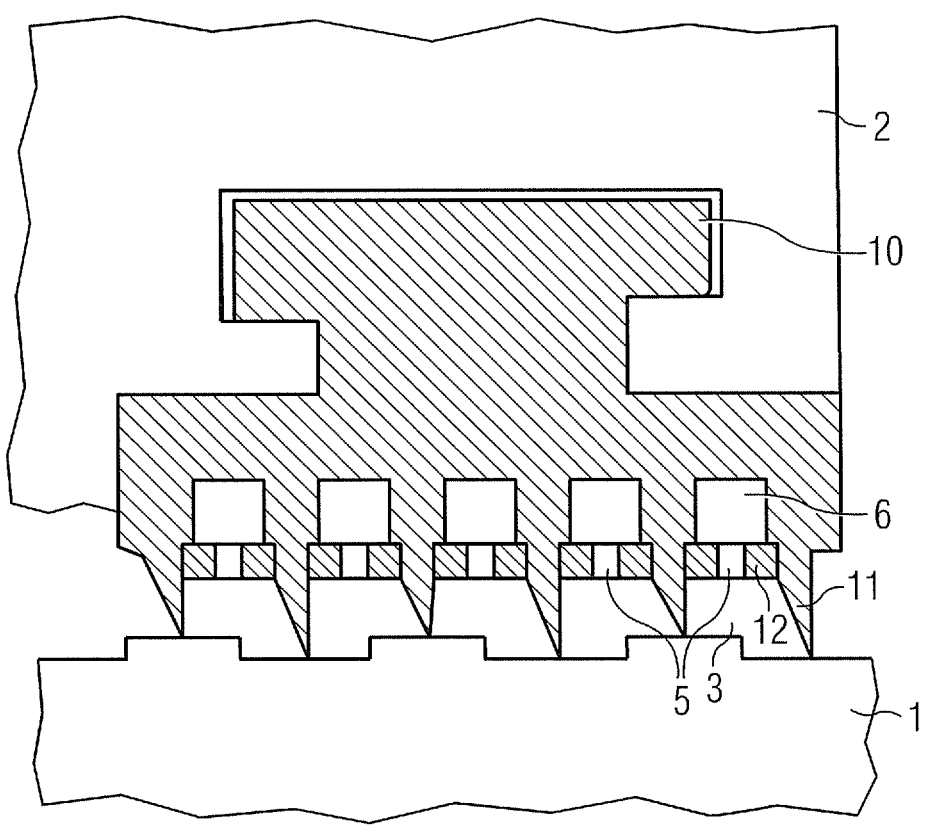
FIG. 3 is a longitudinal section through a labyrinth seal.

A rotor 1 is pivoted in a stator 2. The rotor 1 and the stator 2 belong to a rotating turbo-machinery for example a compressor, a steam turbine, a gas turbine, an expander, an electric motor, or a pump. For sealing a close clearance gap 3 is present between a rotor surface of the rotor 1 and a stator surface 4 of the stator 2. The surfaces surrounding the clearance gap 3 basically can have any geometry ranging from single diameter, staggered, conical, etc.

The rotor surface or the stator surface 4 or both surfaces are provided with openings 5 which open into at least one chamber 6 arranged at that side of the openings 5 turned away from the clearance gap 3. As shown more clearly in FIGS. 1 and 2 a perforated plate 7 having openings 5 is fastened to the stator 2. At the back side of the perforated plate 7, that is the side turned away from the clearance gap 3, webs 8 or ribs are provided in circumferential direction. The webs 8 surround annular chambers 6 which inner width is greater than the inner width of the openings 5 and into which a series of openings 5 opens. The various annular chambers 6 can be axially interconnected through holes 9 in the webs 8 of the perforated plate 7, thus forming one large annular chamber.

The close clearance gap 3 is filled with a fluid which is the result of the rotating rotor surface and the stationary stator surface 4 that are in close proximity to each other. Through the openings 5 the annular chambers 6 are in contact with the close clearance gap 3 and the fluid therein. Because of a leakage of fluid through the openings 5 there is annular pressure equalizing.

The labyrinth seal shown in FIG. 3 consists of a labyrinth holder 10 that has several labyrinth teeth 11. The labyrinth holder 10 is arranged in the stator 2. The labyrinth teeth 11 face the surface of the rotor 1 defining a small clearance 3. The rotor surface basically can have any geometry ranging from single diameter, staggered, conical, etc.

Figure 4:
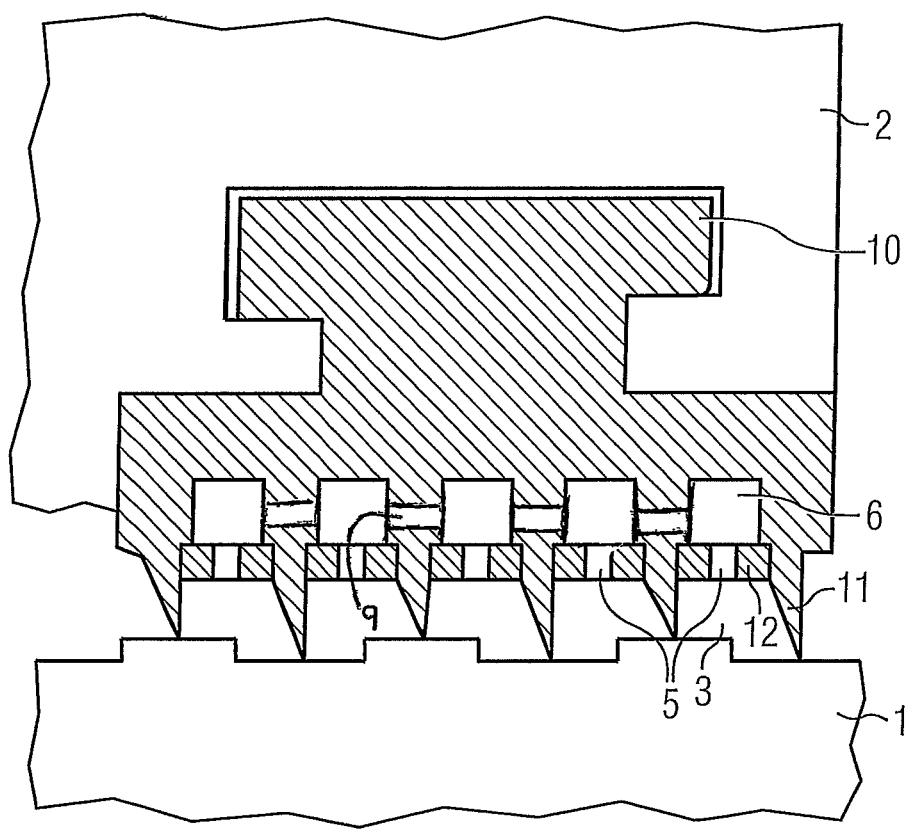
FIG. 4 is a longitudinal section through a labyrinth seal according to further embodiment.

Between each labyrinth tooth 11 a perforated section 12 having perforations or openings 5 is present creating pressure equalizing chambers 6 at the backside of this perforated section 12. The openings 5 are typically arranged more or less perpendicular to the sealing surface and can have special geometry optimizing the dynamical behaviour of the labyrinth. In a further embodiment shown in FIG. 4, the chambers 6 are axially connected by holes 9. The chambers 6 may be filled with damping material.

The invention claimed is:

1. A seal assembly between a rotor and a stator of a turbomachine, comprising:
   a clearance gap;
   a plurality of annular chambers,
   wherein the clearance gap is disposed between the rotor and the stator,
   wherein the clearance gap is bordered by a rotor surface at a first side of the rotor and by a stator surface at a second side of the stator,
   wherein the rotor surface and/or the stator surface are provided with a plurality of openings which open into the plurality of annular chambers arranged at a third side of the plurality of openings turned away from the clearance gap, and
   wherein the plurality of annular chambers are axially interconnected by a plurality of axial holes.

2. The seal assembly between a rotor and a stator as claimed in claim 1, wherein the seal assembly is disposed on a turbo-machinery.

3. The seal assembly as claimed in claim 1, wherein a first inner width of the plurality of chambers is larger than a second inner width of the plurality of openings.

4. The seal assembly as claimed in claim 1,
   wherein the plurality of annular chambers extend in a circumferential direction, and
   wherein into each of the plurality of annular chambers a plurality of openings open.

5. The seal assembly as claimed in claim 4,
   wherein the plurality of openings are perforations of a perforated plate fastened to the stator surface, and
   wherein the plurality of chambers are arranged at a back side of the perforated plate.

6. The seal assembly as claimed in claim 5,
   wherein a plurality of ribs are disposed at the back side of the perforated plate in the circumferential direction, and
   wherein the plurality of ribs surround the plurality of annular chambers.

7. The seal assembly as claimed in claim 1, wherein a plurality of axes of the openings are essentially perpendicular to an axis of the rotor to be sealed.

8. The seal assembly as claimed in claim 1,
   further comprising a labyrinth holder including labyrinth teeth with the plurality of chambers in between,
   wherein the labyrinth holder is arranged in the stator, and
   wherein a perforated section including the plurality of openings is installed between the labyrinth teeth and the plurality of chambers.

9. The seal assembly as claimed in claim 1,
   wherein each of the plurality of openings is a hole and more than one hole is arranged in an axial plane, and
   wherein an axial direction is defined with reference to a rotation axis of the rotor.

10. The seal assembly as claimed in claim 9, wherein a plurality of holes are arranged in one axial plane.

\* \* \* \* \*